US008046494B2

(12) United States Patent
Levenberg

(10) Patent No.: US 8,046,494 B2
(45) Date of Patent: *Oct. 25, 2011

(54) EXTENSIBLE TRANSCODER ANNOTATION FOR TRANSCODING PROXY SERVERS

(75) Inventor: Richard M. Levenberg, Lafayette, CA (US)

(73) Assignee: Access Co., Ltd., Tokyo (JP)

( * ) Notice: Subject to any disclaimer, the term of this patent is extended or adjusted under 35 U.S.C. 154(b) by 19 days.

This patent is subject to a terminal disclaimer.

(21) Appl. No.: 11/390,963

(22) Filed: Mar. 28, 2006

(65) Prior Publication Data

US 2007/0011355 A1 Jan. 11, 2007

Related U.S. Application Data

(63) Continuation of application No. 09/825,031, filed on Apr. 2, 2001, now Pat. No. 7,020,721.

(51) Int. Cl.
*G06F 15/16* (2006.01)
*G06F 17/26* (2006.01)

(52) U.S. Cl. ........ 709/246; 715/512; 715/517; 715/526; 726/12

(58) Field of Classification Search .................. 709/246; 715/512, 517, 526
See application file for complete search history.

(56) References Cited

U.S. PATENT DOCUMENTS

| | | | | |
|---|---|---|---|---|
| 6,219,831 B1 | 4/2001 | Ono | | 717/136 |
| 6,247,048 B1 * | 6/2001 | Greer et al. | | 709/219 |
| 6,300,947 B1 * | 10/2001 | Kanevsky | | 715/866 |
| 6,430,624 B1 * | 8/2002 | Jamtgaard et al. | | 709/246 |
| 6,457,030 B1 * | 9/2002 | Adams et al. | | 715/523 |
| 6,556,217 B1 * | 4/2003 | Makipaa et al. | | 345/667 |
| 6,589,291 B1 * | 7/2003 | Boag et al. | | 715/513 |
| 6,593,944 B1 * | 7/2003 | Nicolas et al. | | 715/744 |
| 6,665,642 B2 * | 12/2003 | Kanevsky et al. | | 704/260 |
| 6,704,798 B1 | 3/2004 | Mogul | | 709/246 |
| 6,742,181 B1 | 5/2004 | Koike et al. | | 719/317 |
| 6,822,663 B2 * | 11/2004 | Wang et al. | | 715/854 |
| 6,826,597 B1 | 11/2004 | Lonnroth et al. | | 709/246 |
| 6,970,918 B2 * | 11/2005 | Brown et al. | | 709/219 |
| 7,111,076 B2 * | 9/2006 | Abjanic et al. | | 709/246 |
| 7,120,702 B2 * | 10/2006 | Huang et al. | | 709/246 |
| 7,143,342 B1 * | 11/2006 | Baweja et al. | | 715/513 |
| 7,203,901 B2 * | 4/2007 | Chen et al. | | 715/205 |
| 7,213,072 B2 * | 5/2007 | Coulombe et al. | | 709/229 |
| 2002/0107985 A1 * | 8/2002 | Hwang et al. | | 709/246 |
| 2002/0129345 A1 * | 9/2002 | Tilden et al. | | 717/162 |
| 2002/0133569 A1 * | 9/2002 | Huang et al. | | 709/219 |
| 2002/0143821 A1 | 10/2002 | Jakubowski | | 707/522 |

* cited by examiner

*Primary Examiner* — Jeffrey Pwu
*Assistant Examiner* — Guang Li
(74) *Attorney, Agent, or Firm* — Berry & Associates P.C.

(57) ABSTRACT

Within one embodiment of the present invention, the rules for transcoding web content are abstracted from the transcoding functionality of a transcoding proxy server. Specifically, within the transcoding proxy server, the functions that perform the transcoding of web content for a device having limited display capabilities is completely separate and distinct from the transcoding rules, e.g., extensible transcoder annotation (XTA), that provide the order, manner, and/or what web content should be transcoded for the requesting device. Therefore, when the transcoding proxy server receives a web page request from a device, its transcoding software accesses an XTA file to find a rule set that pertains to the web page request. Upon finding a corresponding XTA rule set, the transcoding proxy server follows the instructions of the rule set in order to transcode the requested web page for the device having limited display capabilities.

31 Claims, 8 Drawing Sheets

LAYOUT XTA RULE SET
302

<PAGE ID = "123TABLE"  PRIORITY =0  ORDERING="EXPLICIT"> ←— 304

<TABLE PRIORITY=-1 ORDER=3/> ←— 306

<TABLE PRIORITY=1 ORDER=2 SIZE="SMALL"/> ←— 308

<TABLE PRIORITY=0 ORDER=1 SIZE="NORMAL"/> ←— 310

</PAGE>

FIGURE 3A

SPECIFIC XTA RULE SET
322

```
<PAGE ID="HTTP://WWW.YAHOO.COM" PRIORITY=0 ORDERING="EXPLICIT">  ← 324

<TABLES "123TABLE" PRIORITY =0 ORDER=1/>   ← 326

<ANCHOR PRIORITY=0 ORDER=2 SIZE="NORMAL"/>   ← 328

<ANCHOR PRIORITY=0 ORDER=5 SIZE="NORMAL"/>   ← 330

<ANCHOR PRIORITY=0 ORDER=4 SIZE="NORMAL"/>   ← 332

<ANCHOR PROIRITY=0 ORDER=3 SIZE="NORMAL"/>   ← 334

</PAGE>
```

FIGURE 3B

DEFAULT XTA RULE SET
340

<PAGE ID="DEFAULT" PRIOITY=0 ORDERING="IMPLICIT"> ⟵ 342

<ALL IMAGES PRIORITY=-1 ORDER=1/> ⟵ 344

<ALL TABLES PRIORITY=-1 ORDER=2/> ⟵ 346

<ALL JAVASCRIPT PRIORITY=-1 ORDER=3/> ⟵ 348

<ALL JAVA PROIRITY=-1 ORDER=4/> ⟵ 350

</PAGE>

FIGURE 3C

EXTENSIBLE TRANSCODER ANNOTATION FOR TRANSCODING PROXY SERVERS

CROSS REFERENCE TO RELATED APPLICATIONS

This application is a continuation application of application Ser. No. 09/825,031, entitled "Extensible Transcoder Annotation for Transcoding Proxy Servers," filed Apr. 2, 2001, to be issued as U.S. Pat. No. 7,020,721, and assigned to the assignee of the present application. The subject matter in the above-identified and commonly owned application is incorporated herein by reference.

TECHNICAL FIELD

The present invention generally relates to the field of computers. More particularly, the present invention relates to the field of transcoding proxy servers.

BACKGROUND ART

Computers and other electronic devices have become integral tools used in a wide variety of different applications, such as finance and commercial transactions, computer-aided design and manufacturing, health care, telecommunication, education etc. Computers along with other electronic devices are finding new applications as a result of advances in hardware technology and rapid development in software technology. Furthermore, the functionality of a computer system or other type of electronic device is dramatically enhanced by coupling these type of stand-alone devices together in order to form a network environment. Within a networking environment, users may readily exchange files, share information stored on a common database, pool resources, and communicate via electronic mail (e-mail) and video teleconferencing. Furthermore, computers along with other types of electronic devices which are coupled to the internet provide their users access to data and information from all over the world. Computer systems have become useful in many aspects of everyday life both for personal and business uses.

Included within this broad category of computers and electronic devices is the personal digital assistant (commonly referred to as a PDA). Specifically, as the components required to build a computer system have been generally reduced in size, new categories of computer systems have emerged. One of these new categories of computers is the personal digital assistant. A personal digital assistant is a portable computer system which is small enough to be held in the hand of its user and can be "palm sized". Additionally, some personal digital assistants are enhanced with the capability to be coupled to the internet using wired or wireless technology thereby providing their users access to an extremely large amount of data and information. However, there are disadvantages associated with personal digital assistants accessing the internet.

For example, one of the disadvantages is that internet web pages are typically developed for color display screens having a resolution of 800×600 or larger and it does not scale very well to the small display screens that are typically implemented with personal digital assistants. As such, several different techniques have been developed in order to enable personal digital assistants to handle web pages from the internet.

One of the techniques for enabling personal digital assistants to handle web pages from the internet is referred to a web scraping. Within one variety of web scraping, one or more persons actually view an original web page on the internet and determine which content is relevant and how to arrange it for the small display screens of personal digital assistants. Next, the scraped web content of the original web page is stored by a special web server which is accessible by personal digital assistants. Therefore, personal digital assistants are able to receive the scrapped web page content of the original web page from the special web server. It should be appreciated that once a web page has been scraped, personal digital assistant users are usually notified in some manner where to access the scraped web page.

There are disadvantages associated with the web scraping technique described above. For example, personal digital assistants are typically only able to access web content from web pages that have been previously scraped. That is, personal digital assistants are not provided the freedom of accessing any web page on the internet. Instead, personal digital assistants are limited to access pre-made (scraped) web pages. Furthermore, personal digital assistants are unable to access web pages by using their direct URL (Uniform Resource Locator). Instead, web scraping technologies involve personal digital assistant users going to another location (e.g. URL) in order to access web page content. It should be understood this may be an unattractive to personal digital assistant users because they desire the convenience of just typing in the URL and accessing its corresponding web page.

Another technique for enabling personal digital assistants to handle web pages from the internet is to utilize a transcoding proxy server. Specifically, instead of a personal digital assistant accessing web pages of the internet directly, it requires web pages from a transcoding proxy server. However, before delivering the requested web pages to the requesting personal digital assistant, the transcoding proxy server typically performs a "best guess" transcoding of the web pages which may involve stripping out all of the web content (e.g. images, Java, JavaScript, tables etc.) that the small display screen of the personal digital assistant is unable to handle. Subsequently, the transcoding proxy server transmits the remaining web content to the personal digital assistant.

However there are disadvantages associated with the "best guess" transcoding technique performed by transcoding proxy servers. For example, one disadvantage is that the "best guess" transcoding technique provides very poor quality web page product (from the view of the web page providers and personal digital assistant users) to personal digital assistants.

Yet another technique for enabling personal digital assistants to handle web pages from the internet is referred to as web clipping. Specifically, the web clipping technique involves installing a web clipping application on a personal digital assistant for each web page that its user desires to receive information from. Typically, when activated, a web clipping application transmits a request to an internet server for limited web content (commonly referred to as web clipping) from a specific web page. It is appreciated that a web clipping is compressed HTML (Hypertext Markup Language) page which is transmitted by the internet server to the requesting personal digital assistant.

It should be appreciated that there are disadvantages associated with the web clipping technique. For example, personal digital assistants using the web clipping technique have limited access to the internet. Specifically, if a personal digital assistant does not have a web clipping application corresponding to a specific web page, it is unable to access web content from that web page. Therefore a web clipping application has to be developed by someone for every web page a personal digital assistant user desires to access. Furthermore, another disadvantage is with the web clipping technique is that a personal digital assistant is unable to request web clippings from a specific web page until the corresponding web clipping application has been installed on the personal digital assistant. In other words, the internet access of a personal digital assistant is limited by the web clipping applications installed on it.

DISCLOSURE OF THE INVENTION

Accordingly, a need exists for a method and system for providing quality web page products from the internet to personal digital assistants. Furthermore, a need exists for a method and system which satisfies the above need and enables personal digital assistants to access any web page on the internet. Additionally, a need exists for a method and system which satisfies the above needs and is not cumbersome to users of personal digital assistants. Embodiments of the present invention provide a method and system which accomplishes the above mentioned needs.

For example, within a transcoding proxy server in accordance with an embodiment of the present invention, the rules for transcoding web content are abstracted from the transcoding functionality of the transcoding proxy server. Specifically, within the transcoding proxy server, the functions that perform the transcoding of web content for a device having limited display capabilities are completely separate and distinct from the transcoding rules, e.g., extensible transcoder annotation (XTA), that provide the order, manner, and/or what web content should be transcoded for the requesting device. Therefore, when the transcoding proxy server receives a web page request from a device, its transcoding software accesses an XTA file (or database) to find a rule set (or instruction set) that pertains to the requested web page. Upon finding a corresponding XTA rule set, the transcoding proxy server executes the instructions of the rule set in order to transcode the requested web page for the device having limited display capabilities.

There are advantages associated with abstracting the rules of transcoding web content from the transcoding functionality of a transcoding proxy server in accordance with the present invention. For example, one of the advantages is that XTA rule sets may be created to include information about what objects have relevant content within the specific web pages and/or classes of web pages. By providing this information to the transcoding proxy server, it is able to better transcode web pages for the requesting device having limited display capabilities and thereby enhance its user's overall experience. Another advantage is that while the transcoding proxy server is transcoding web pages, an embodiment of the present invention enables a person to utilize a computer coupled to the transcoding proxy server to remotely add, delete, and edit XTA rule sets within its XTA file. In other words, XTA rule sets may be added, deleted, and edited within the XTA file stored by the transcoding proxy server without having to suspend it from transcoding web pages. Furthermore, once changes are made to the XTA file of the transcoding proxy server, it is able to immediately execute any XTA rule set contained within its XTA file. Therefore, the manner in which the transcoding proxy server transcodes a web page and/or a class of web pages may be changed at any time by changing the corresponding XTA rule set or sets of its XTA file.

In another embodiment, the present invention includes a non-transitory computer readable medium having computer readable code embodied therein for causing a transcoding proxy server to perform particular steps. The computer readable medium causes the transcoding proxy computer to perform the step of receiving a web page request from a portable computing device. Additionally, the computer readable medium causes the transcoding proxy computer to perform the step of transmitting the web page request to a server computer coupled to the transcoding proxy computer. The computer readable medium also causes the transcoding proxy computer to perform the step of receiving from the server computer a web page element corresponding to the web page request. Furthermore, the computer readable medium causes the transcoding proxy computer to perform the step of locating a first annotation rule set that corresponds to the web page request. It is appreciated that the first annotation rule set is distinct from transcoding functionality utilized by the transcoding proxy server. Moreover, the computer readable medium causes the transcoding proxy computer to perform the step of transcoding the web page element for the portable computing device by following the first annotation rule set and utilizing the transcoding functionality.

The present invention provides these advantages and others which will no doubt become obvious to those of ordinary skill in the art after having read the following detailed description of embodiments in accordance with the present invention.

BRIEF DESCRIPTION OF THE DRAWINGS

The accompanying drawings, which are incorporated in and form a part of this specification, illustrate embodiments of the invention and, together with the description, server to explain the principles of the invention.

FIG. 3A illustrates a layout XTA rule set in accordance with one embodiment of the present invention.

FIG. 3B illustrates a specific XTA rule set in accordance with one embodiment of the present invention.

FIG. 3C illustrates a default XTA rule set in accordance with one embodiment of the present invention.

DETAILED DESCRIPTION OF THE INVENTION

Figure 1:
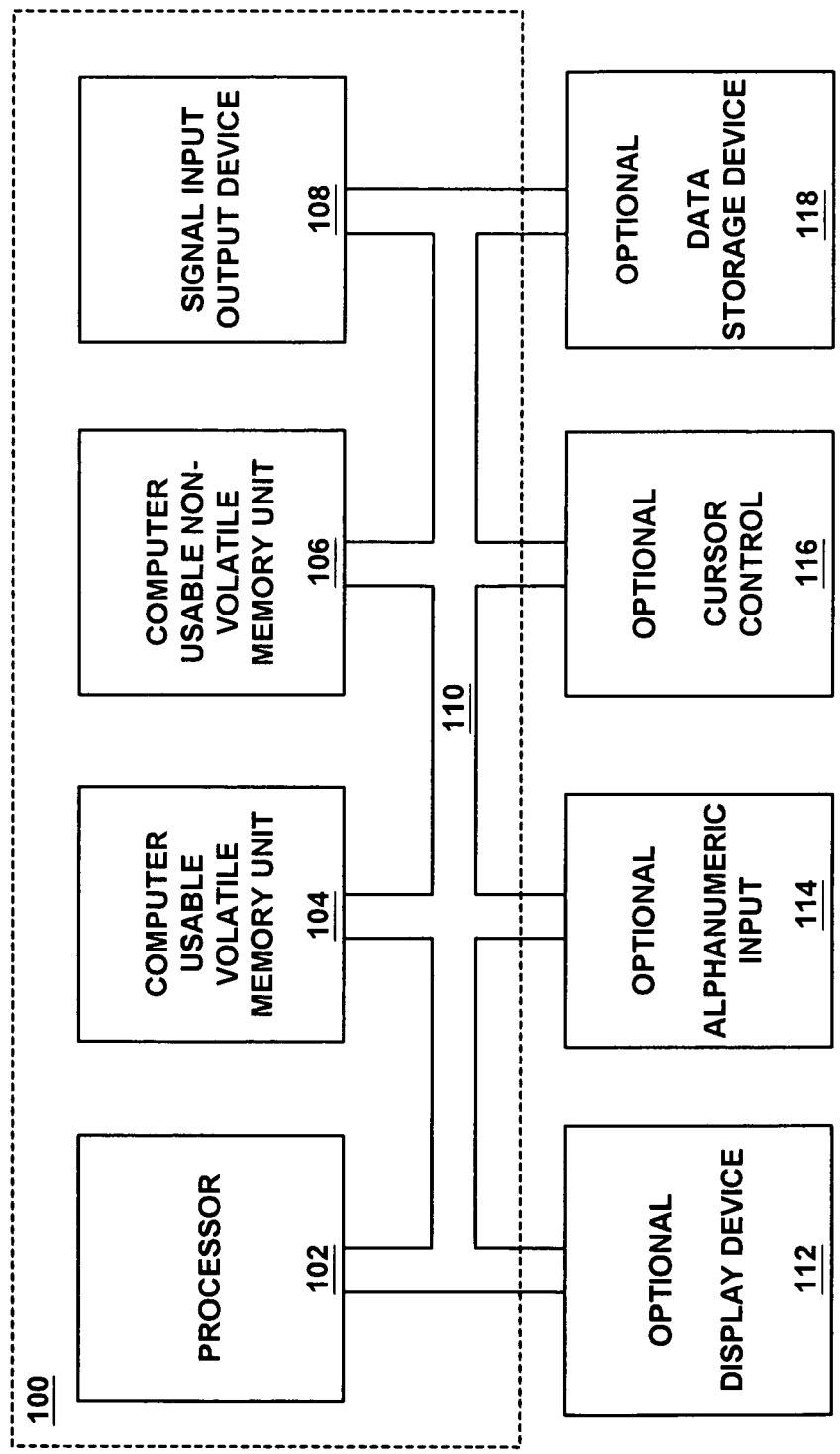
FIG. 1 is a block diagram of one embodiment of an exemplary computer system used in accordance with the present invention.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have been described in detail as not to unnecessarily obscure aspects of the present invention.

Some portions of the detailed descriptions which follow are presented in terms of procedures, logic blocks, processing, and other symbolic representations of operations on data bits within a computer or digital system memory. These descriptions and representations are the means used by those skilled in the data processing arts to most effectively convey the substance of their work to others skilled in the art. A procedure, logic block process, etc., is herein, and generally, conceived to be a self-consistent sequence of steps or instructions leading to a desired result. The steps are those requiring physical manipulations of physical qualities. Usually, though not necessarily, these physical manipulation take the form of electrical or magnetic signals capable of being stored, transferred, combined, compared, and otherwise manipulated in a computer system or similar electronic computing device. For reasons of convenience, and with reference to common usage, these signals are referred to as bits, values, elements, symbols, characters, terms, numbers, or the like with reference to the present invention.

It should be borne in mind, however, that all of these terms are to be interpreted as referring to physical manipulations and quantities and are merely convenient labels and are to be interpreted in further view of terms commonly used in the art. Unless specifically stated otherwise as apparent from the following discussions, it is understood that throughout discussions of the present invention, discussions utilizing terms such as "determining" or "transcoding" or "locating" or "controlling" or "transmitting" or "receiving" or "recognizing" or "generating" or "utilizing" or "following" or the like, refer to the action and processes of a computer system, or similar electronic computing device, that manipulates and transforms data. The data is represented as physical (electronic) quantities within the computer system's registers and memories and is transformed into other data similarly represented as physical quantities within the computer system memories or registers or other such information storage, transmission, or display devices.

An Exemplary Computer System in Accordance with the Present Invention

Figure one is a block diagram of one embodiment of an exemplary computer system 100 used in accordance with the present invention. It should be appreciated that system 100 of the present embodiment is well suited to be other types of computers (e.g. portable laptop computer, desktop computer, server computer, and the like). Within the following discussions of the present invention, certain processes and steps are discussed that are realized, in one embodiment, as a series of instructions (e.g. software program) that reside within computer readable memory units of the computer system 100 and executed by processor(s) of system 100. When executed, the instructions cause system 100 to perform specific actions and exhibit specific behavior which is described in detail below.

In general computer system 100 of FIG. 1 used by an embodiment of the present invention comprises an address/data bus 110 for communicating information, one or more central processors 102 coupled with bus 110 for processing information and instructions. Central processor unit 102 may be a microprocessor or any other type of processor. The computer system 100 also includes data storage features such as a computer usable volatile memory unit 104 (e.g. random access memory, static RAM, dynamic RAM, etc.) coupled with bus 110 for storing information and instructions for central processor(s) 102, a computer usable non-volatile memory unit 106 (e.g., read only memory, programmable ROM, flash memory, EPROM, EEEPROM, etc.) coupled with bus 110 for storing static information and instructions for processor(s) 102. System 100 also includes a signal generating and receiving device 108 coupled with bus 110 for enabling system 100 to interface with other electronic devices. In one embodiment of the present invention, the communication interface 108 is a serial communication port, but could also alternatively be any of a number of well known communication standards and protocols, e.g. Universal Serial Bus (USB), Ethernet, FireWire IEEE 1394, parallel, small computer system interface (SCSI), infrared (IR) communication, Bluetooth wireless communication, etc.

Optionally, computer system 100 can include a display device 112 which is coupled to bus 110 for displaying graphics and/or video. It should be appreciated that optional display device 112 may be a cathode ray tube (CRT), flat panel liquid crystal display (LCD), field emission display (FED), or any other display suitable for displaying video and/or graphic images and alphanumeric characters recognizable to a user. Furthermore, system 100 can include an optional alphanumeric input device 114 including alphanumeric and function keys coupled to the bus 110 for communicating information and command selections to the central processor(s) 102.

Additionally, the computing device 100 of FIG. 1 can include an optional control or cursor directing device 116 coupled to the bus 110 for communicating user input information and command selections to the central processor(s) 102. The cursor directing device 116 can be implemented using a number of well known devices such as a mouse, a track-ball, a track pad, an optical tracking device, a touch screen etc. Alternatively, it is appreciated that a cursor can be directed and/or activated via input from alphanumeric input device 114 using special keys and key sequence commands. The present embodiment is also well suited to directing a cursor by other means such as. For example, voice commands. In addition, the cursor directing device 116 can also be a remote control device (e.g. a universal remote control device having a number of buttons dial etc.) with an infrared signal communication capability. System 100 can also include a computer usable mass data storage device 118 such as a magnetic or optical disk and disk drive (e.g., hard drive or floppy diskette) coupled with bus 110 for storing information and instructions.

Exemplary Network in Accordance with the Present Invention

Figure 2:
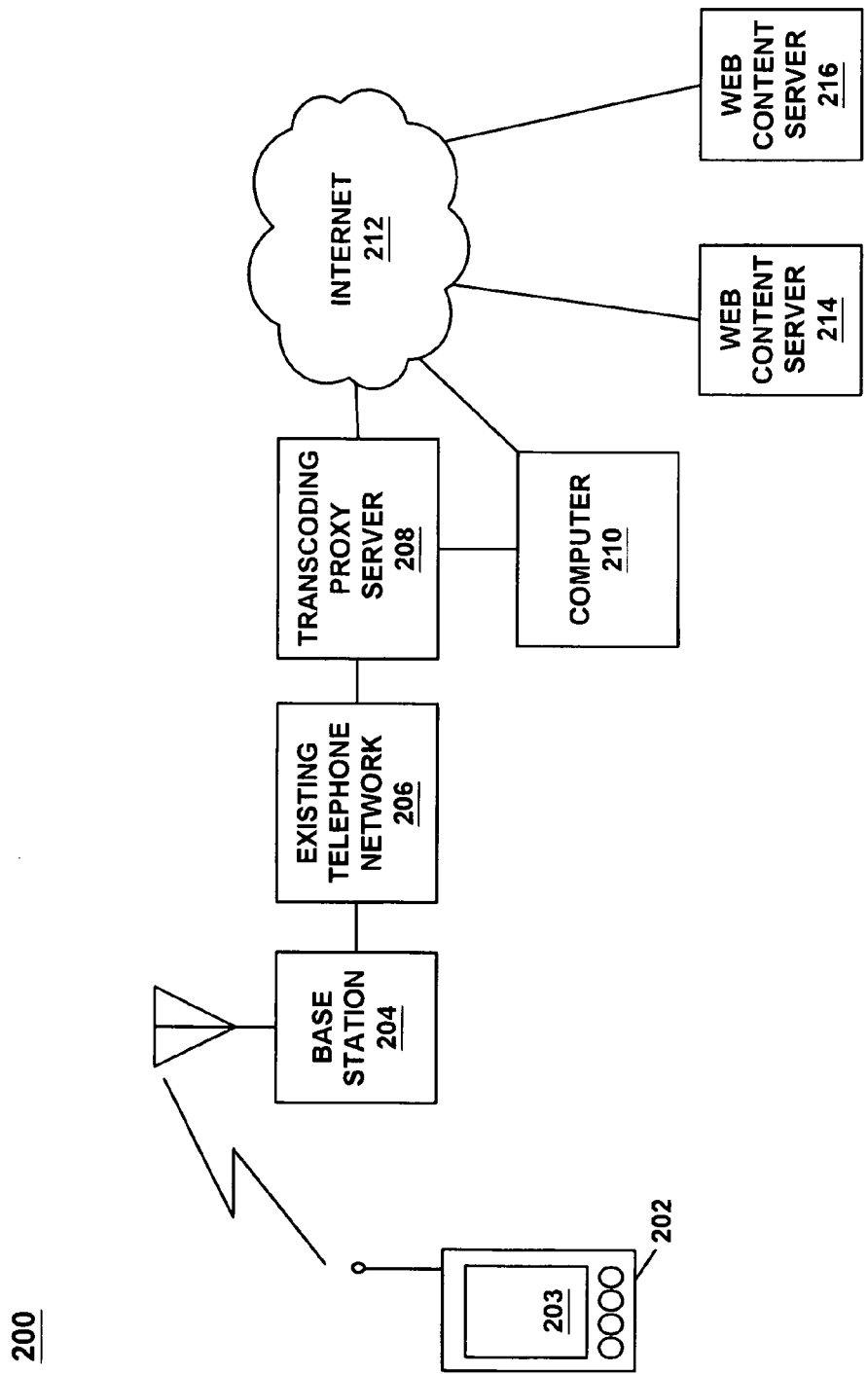
FIG. 2 is a block diagram of an exemplary network environment in accordance with one embodiment of the present invention.

FIG. 2 is a block diagram of an exemplary network environment 200 in accordance with one embodiment of the present invention. Network environment 200 includes a transcoding proxy server 208 which is coupled to communicate with a personal digital assistant (PDA) 202 and the internet 212. Within the present embodiment, one of the functions of transcoding proxy server 208 is to perform operations over the internet 212 on behalf of personal digital assistant 202.

For example, transcoding proxy server 208 may have a particular internet address and it may act as a proxy device for personal digital assistant 202 over the internet 212. As such, transcoding proxy server 208 may access, transcode, and deliver requested web content from the internet 212 to personal digital assistant 202. In this manner, personal digital assistant 202 is able to receive web content that its limited sized display screen 203 is able to handle.

Specifically, network environment 200 includes personal digital assistant 202 that has the ability to transmit and receive data and information over a wireless communication interface. (e.g. radio interface). It is understood that personal digital assistant 202 is a portable computing device that is fabricated small enough to be held in the hand of the user and may be "palm sized". As such, personal digital assistant 202 typically has a display screen 203 having limited capabilities. It should be appreciated that personal digital assistant 202 of the present embodiment is well suited to be any type of portable computing device (e.g. mobile phone, pager, and the like) that typically has limited display capabilities. Network environment 200 also includes a base station 204 that is a transmitter and receiver base station which can be implemented by coupling it to an existing public telephone network 206. Implemented in this manner, base station 204 enable personal digital assistant 202 to communicate with transcoding proxy server computer 208 which is coupled to the existing public telephone network 206. It should be appreciated that the data and information communicated between base station 204 and personal digital assistant 202 are the same type of information and data can conventionally be transferred and received over a public telephone wired network system. However, a wireless communication interface is utilized to communicate data and information between personal digital assistant 202 and base station 204.

Network environment 200 of FIG. 2 also includes a computer system 210 that is coupled to transcoding proxy server 208 thereby enabling computer system 210 to download software instructions (in accordance with an embodiment of the present invention) to transcoding proxy server 208. Furthermore, computer 210 is coupled to the internet 212 thereby enabling personal digital assistant 202 to communicate with web content servers (e.g. 214 and 216) via the internet 212. The transcoding proxy server 208 is coupled to the Internet 212 thereby enabling personal digital assistant 202 to communicate with web content servers (e.g. 214 and 216) via the Internet 212. Moreover it is understood that personal digital assistant 202 of the present embodiment may be communicatively coupled to a transcoding proxy server 208 via wired and/or wireless technology. It is appreciated that transcoding proxy server 208, computer 210, and web content servers 214 and 216 of the present embodiment may be implemented in a manner similar to computer 100 described above with reference to FIG. 1.

Exemplary Transcoder Annotation in Accordance with the Present Invention

FIGS. 3A, 3B, and 3C illustrate embodiments of extensible transcoder annotation (XTA) rule sets in accordance with the present invention. It is understood that within a transcoding proxy server in accordance with an embodiment of the present invention, the rules for transcoding web content (e.g. XTA) are abstracted from the transcoding functionality of the transcoding proxy server. Specifically, within the transcoding proxy server, the functions that perform the transcoding of web content for a device having limited capabilities is completely separate and distinct from its transcoding rules software (e.g. XTA) that provides the order, manner and/or what web content should be transcoded for the requesting device. As such, when the transcoding proxy server receives a web page request from a device, its transcoding software accesses an XTA file (or database) to find an XTA rule set or instruction set that pertains to the requested web page. Upon finding a corresponding XTA rule set, the transcoding proxy server follows the instructions of the rule set in order to transcode the requested web page for the device having limited display capabilities.

There are advantages associated with abstracting the rules of transcoding web page content (e.g. XTA) from the transcoding functionality of a transcoding proxy server in accordance with an embodiment of the present invention. For example one of the advantages is that XTA rule sets may be created to include information about what objects have relevant content within specific web pages or classes of web pages. By providing this information to a transcoding proxy server (e.g. 208), it is able to better transcode web pages for the requesting device (e.g. 202) having limited display capabilities. In this manner, the overall experience is enhanced for a user of the requesting device (e.g. 202) having limited display capabilities. Another advantage is XTA rule sets may be specifically tailored for any type of device having limited display capabilities. For example, an XTA rule set designed for directing a transcoding proxy server (e.g., 208) to transcode a web page for a personal digital assistant may be different from an XTA rule set designed for a mobile phone. It is understood that the transcoding functionality of a transcoding proxy server is specifically designed for transcoding web pages for the type of device it services.

Another advantage associated with abstracting the rules of transcoding web page content (e.g. XTA) from the transcoding functionality of a transcoding proxy server is that while a transcoding proxy server (e.g. 208) is transcoding a web page, an embodiment of the present invention enables a person to utilize a computer (e.g. 210) coupled to the transcoding proxy server (e.g. 208) to remotely add, delete, and edit XTA rule sets within its XTA file. In other words, XTA rule sets may be added, deleted, and edited within the XTA file stored by the transcoding proxy server without having to suspend it from transcoding web pages. Furthermore, once changes are made to the XTA file of the transcoding proxy server, it is able to immediately follow any XTA rule set contained within its XTA file. Therefore, the manner in which the transcoding proxy server transcodes a web page and/or classes of web pages may be changed at any time by changing the corresponding XTA rule set(s) of its XTA file. As such, portable devices (e.g. 202) and web content servers (e.g. 214) are not involved with changing an XTA rule set(s).

It is understood that a web page which is an object typically contains objects which represent either web page content or web page layout. For example, web page content objects may include anchors, images, blockquotes, form input, ordered and unordered lists, etc. Additionally, web page layout objects may include tables, frames, and forms. Within the present embodiment, an XTA rule set may specify to a transcoding proxy server (e.g. 208) the order, manner, and/or what web objects to transcode for a particular web page request received from a device (e.g. 202) having limited display capabilities. More specifically, an XTA rule set may contain instructions pertaining to the content and/or layout of a particular web page or class of web pages along with information about what web objects contain content relevant to the requesting device having limited display capabilities. It is understood that instructions of an XTA rule set may deal with a web page or class of web pages on an object level. However, an XTA rule set is not limited to object level instructions. It should be noted that an XTA rule set does not contain any web content itself.

Within an embodiment of the present invention, an XTA rule set may consist of a "snapshot" of the content of a web page in highly reduced form along with additional information regarding the priority and/or relevance of various objects within the web page. There are many ways to create the XTA rule set in accordance with an embodiment of the present invention. For example a user of computer 210 may create a "snapshot" of a web page by using a tool which runs through the source HTML (Hypertext Markup Language) of the web page. The content of the webpage is removed and then the HTML tags are converted into XTA expressions of the objects they represent. Default attributes may then be added to the objects. Additionally, the user of computer 210 may add information to the XTA rule set regarding the priority and/or relevance of various objects within the web page. It should be appreciated that the more complex the "snapshot" of a web page is, the more XTA possibilities exist.

FIGS. 3A, 3B and 3C illustrate three different types of exemplary XTA rule sets: specific, layout, and default. A specific XTA rule set 322 as shown in FIG. 3B may include transcoding instructions for a transcoding proxy server (e.g. 208) regarding the content and/or layout of a specific web page (e.g. www.yahoo.com). A layout XTA rule 302 as shown in FIG. 3A may include transcoding instructions for a transcoding proxy server (e.g. 208) regarding the layout of a class of web pages that share the same layout properties. For example layout XTA rule set 302 may include transcoding instructions for the class of web pages that have a graphic header at the top of the web page, a navigational menu at the left side of the web page and content covering the remainder of the web page. A default XTA rule set 340 as shown in FIG. 3C may include transcoding instructions for a transcoding proxy server (e.g. 208) regarding web pages that do not match any of the existing XTA rules (e.g. specific XTA rule set 322 and/or layout XTA rule set 302) stored by the transcoding proxy server. Each of these XTA rule sets (e.g. 302, 322, and 340) will be described in greater detail below. However, it is appreciated that the XTA may be implemented in a wide variety of ways and is not restricted to any particular implementation.

Within the XTA rule sets of FIGS. 3A, 3B, and 3C, object elements may have an assigned priority attribute. For example, a priority of zero indicates the highest relevance and indicates to a transcoding proxy server (e.g. 208) that the object is to be preserved. Furthermore a negative priority indicates to the transcoding proxy server that the object is totally irrelevant and may be stripped. A positive non-zero priority indicates relative relevance and the transcoding proxy server is free to decide whether to transcode or strip the objects based on the requesting device's (e.g. 202) capabilities. Additionally, objects elements of XTA rule sets may also have an assigned order attribute. For example, the order allows the objects to be presented by the transcoding proxy server in a different order than the original layout of the web page would suggest. This allows the transcoding proxy server to present more relevant content higher up on the display of a requesting device (e.g. 202) having limited horizontal capabilities.

Within an embodiment of the present invention, it should be appreciated that the binding between a web page request from a device (e.g. 202) and a possible XTA rule set stored by a transcoding proxy server (e.g. 208) could be an XTA rule set within a file or a database that has (for example) the URL (Uniform Resource Locator) of the requesting web page. The binding may be tight, as in a separate XTA rule set for each fully qualified URL, or it may be loose, as in one XTA rule set for a whole set of web pages located at a common root URL.

FIG. 3A illustrates an exemplary layout XTA rule set 302 in accordance with one embodiment of the present invention that may be understood by a transcoding proxy server (e.g. 208). Within the present embodiment, layout XTA rule set 302 may include transcoding instructions for web page layout objects for a device (e.g. 202) having limited display capabilities. For example, web page layout objects may include tables, frames, and forms. Moreover, layout XTA rule set 302 may include transcoding instructions for a class of web pages that share the same web page layout properties. It is appreciated that layout XTA rule set 302 may include a type of transcoding instructions pertaining to web page layout. As such, layout XTA rule set 302 of the present embodiment is not in any way limited to the transcoding instructions shown in FIG. 3A.

Specifically, lines 304, 306, 308 and 310 of layout XTA rule set 302 provide transcoding instructions to a transcoding proxy server (e.g. 208) for a class of web pages having three tables. For example layout XTA rule set 302 may pertain to the type of web pages that have a graphic header at the top of the web page, a navigational menu at the left side of the web page and content covering the remainder of the web page. The transcoding proxy server (e.g. 208) would interpret line 304 to indicate that a web page that pertains to rule set 302 is to be transcoded because it has a priority of zero. Furthermore, at line 304, the transcoding proxy server understands that the presentation order is explicit so it is to follow the ordering attributes of rule set 302 for each table of the web page.

At line 306 of FIG. 3A the transcoding proxy server (e.g., 208) understands that the first table is totally irrelevant and should not be preserved because it has a negative priority value (e.g., -1) At line 308, the transcoding proxy server understands that the second table is relatively relevant because it has a positive priority value (e.g., 1). Additionally, the transcoding proxy server understands from line 308 that the second table of web pages is to be presented second because its order number is to "2". Moreover, the transcoding proxy server understands from line 308 that the second table is to be presented in a manner such that it does not take up much vertical space because its size information is equal to "small." At line 310, the transcoding proxy server understands that the third table is to be presented because its priority value is equal to zero. Furthermore, the transcoding proxy server understands from line 310 that the third table of the web page is to be presented first because its order number is equal to "1". That is, the third table is presented first as opposed to third as the original web page layout would suggest. Moreover, the transcoding proxy server understands from line 310 that the third table is to be presented normally because its size information is equal to "normal".

FIG. 3B illustrates an extremely specific XTA rule set 322 in accordance with one embodiment of the present invention that may be understood and executed by a transcoding proxy server (e.g. 208). Within the present embodiment, specific XTA rule set 322 includes transcoding instructions that a transcoding proxy server (e.g. 208) may follow in order to transcode a specific web page for a device (e.g. 202) having limited display capabilities. Specific XTA rule set 322 may include transcoding instructions pertaining to the content and/or layout of a specific web page. Specifically, web page layout objects may include tables, frames, and forms while web content objects my include anchors, images, blockquotes, form input, ordered and unordered lists, and the like. The specific XTA rule set 322 may be particularly designed for a particular URL (e.g. www.yahoo.com). It is understood that specific XTA rule set 322 may include any type of transcoding instructions pertaining to web page content and/or layout. As such, specific XTA rule set 322 of the present embodiment is not in any way limited to the transcoding instructions pertaining to web page content and/or layout. As such, specific XTA rule set 322 of the present embodiment is not in any way limited to the transcoding instructions shown in FIG. 3B.

Specifically lines 324-334 of specific XTA rule set 322 provide transcoding instructions to a transcoding proxy server (e.g. 208) for the web page having the URL of www.yahoo.com. The Transcoding proxy server (e.g. 208) interprets line 324 to indicate that the web page that pertains to rule set 322 is to be transcoded because it has a priority value equal to zero. Furthermore, at line 324, the transcoding proxy server understands that the presentation order is explicit so it is to follow the ordering attributes of rule set 322 for each listed item of the web page.

At line 326 of FIG. 3B, the transcoding proxy server (e.g. 208) is instructed to transcode all of the tables of the requested web page by following layout XTA rule set 302. As such, it is appreciated that XTA rule sets may be nested within other XTA rule sets. The transcoding proxy server also understands from line 326 that the layout XTA rule set 302 is to be executed because it has a priority of zero. Furthermore, the transcoding proxy server understands from line 326 that the layout XTA rule set 302 is to be executed first because its order value is equal to "1". At line 328, the transcoding proxy server understands that the first anchor is to be presented because it has a priority value equal to zero and it is to be presented normally because its size information is equal to "normal". Additionally, the transcoding proxy server understands from line 328 that the first anchor is to be presented after the layout XTA rule set 302 is to be executed.

At line 330, the transcoding proxy server (e.g., 208) understands that the second anchor is to be presented because it also has a priority value equal to zero and it is to be presented normally because its size information is equal to "normal". However, the transcoding proxy server understands from line 330 that the second anchor is to be presented fifth as opposed to what the original web page would suggest. At line 332, the transcoding proxy server understands that the third anchor is also to be presented because it has a priority value equal to zero and it is to be presented normally because its size information is equal to "normal". The transcoding proxy server understands from line 332 that the third anchor is to be presented fourth. At line 334, the transcoding proxy server understands that the fourth anchor is to be presented because it has a priority value equal to zero and it is to be presented normally because its size information is equal to "normal". The transcoding proxy server understands from line 334 that the fourth anchor is to be presented third because its order value is equal to "3".

FIG. 3C illustrates an exemplary default XTA rule set 340 in accordance with one embodiment of the present invention that may be understood and executed by a transcoding proxy server (e.g., 208). Within the present embodiment, default XTA rule set 340 includes transcoding instructions that a transcoding proxy server (e.g., 208) may follow in order to transcode web pages for a device (e.g., 202) having limited display capabilities. Default XTA rule set 340 may include transcoding instructions pertaining to requested web pages that do not match any of the existing XTA rule sets (e.g., layout XTA rule set 302 and/or specific XTA rule set 322) stored by the transcoding proxy server. It is understood that default XTA rule set 340 may include transcoding instructions pertaining to the content and/or layout of web pages. As mentioned above, web page layout objects may include tables, frames, and forms while web content objects may include anchors, images, blockquotes, form input, ordered and unordered lists, and the like. It is appreciated that default XTA rule set 340 may include any type of transcoding instructions pertaining to web page content and/or layout. As such, default XTA rule set 340 of the present embodiment is not in any way limited to the transcoding instructions shown in FIG. 3C.

Specifically, lines 342, 344, 346, 348 and 350 of default XTA rule set 340 provide transcoding instructions to a transcoding proxy server (e.g., 208) for requested web pages that do not match any of the existing XTA rule sets that may be stored by the transcoding proxy server. The transcoding proxy server interprets line 342 to indicate that a web page that pertains to rule set 340 is to be transcoded because it has a priority value equal to zero. Furthermore, at line 342, the transcoding proxy server understands that the presentation order is implicit meaning the order is the same as the original web page would suggest.

At line 344 of FIG. 3C, the transcoding proxy server (e.g., 208) understands that all of the images of the requested web page are totally irrelevant and should be stripped because it has a negative priority value (e.g., −1). It is understood that when the transcoding proxy server does not preserve something of a web page, it is stripping that item from the web page that it transcodes for the device (e.g., 202) having limited display capabilities. At line 346, the transcoding proxy server understands that all of the tables of the requested web page are totally irrelevant and should be stripped because it has a negative priority value. At line 348, the transcoding proxy server understands that all JavaScript™ of the requested web page is totally irrelevant and should be stripped because it has a negative priority value. At line 350, the transcoding proxy server understands that all of the Java™ of the requested web page is totally irrelevant and should be stripped because it has a negative priority value.

Exemplary Operations in Accordance with the Present Invention

Figure 4:
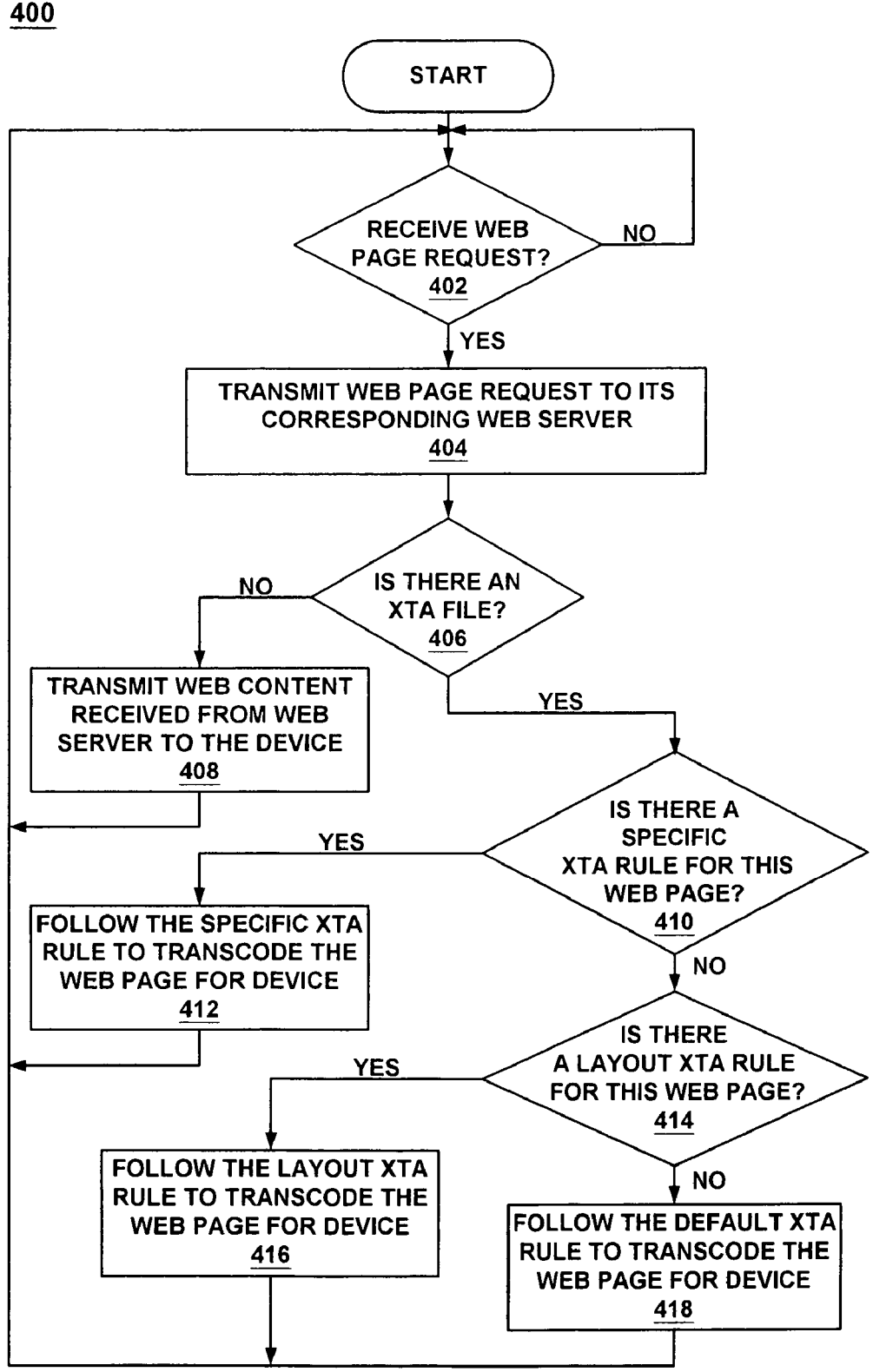
FIG. 4 is a flowchart of steps performed in accordance with one embodiment of the present invention for enabling a transcoding proxy server to utilize extensible transcoder annotation (XTA) to transcode web pages for a portable computing device having limited display capabilities.

FIG. 4 is a flowchart 400 of steps performed in accordance with one embodiment of the present invention for enabling a transcoding proxy server (e g., 208) to utilize extensible transcoder annotation (XTA) to transcode web pages for a portable computing device (e.g., 202) having limited display capabilities. Flowchart 400 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 400, such steps are exemplary. That is, the present invention is well suited to performing various other steps or variations of the steps recited in FIG. 4. Within the present embodiment, it should be appreciated that the steps of flowchart 400 may be performed by software or hardware or any combination of software and hardware.

Within the present embodiment, the rules for transcoding web pages are abstracted from the transcoding functionality of a transcoding proxy server (e.g., 208). Specifically, within the transcoding proxy server (e.g., 208), the functions that perform the transcoding of the web content for a device (e.g., 202) having limited display capabilities is completely separate and distinct from its transcoding rules software (e.g., XTA) that provides the order, manner, and/or what web page content should be transcoded for the requesting device. Therefore, when the transcoding proxy server (e.g., 208) receives a web page request from a device (e.g., 202) having limited display capabilities, the present embodiment determines whether an XTA file (or database) exists within a memory device or devices of the transcoding proxy server. If the XTA file exists, the present embodiment searches for a specific XTA rule set (e.g., 322) that pertains to the requested web page. If a specific XTA rule set (e.g., 322) is not found, the present embodiment searches for a layout XTA rule set (e.g., 302) that pertains to the requested web page. If a layout XTA rule set (e.g., 302) is not found, the present embodiment accesses the default XTA rule set (e.g., 340). As such, upon finding a corresponding XTA rule set, the present embodiment causes the transcoding proxy server (e.g., 208) to follow the instructions of the XTA rule set in order to transcode the requested web page for the device (e.g., 202) having limited display capabilities.

It should be appreciated that flowchart 400 is described in conjunction with FIGS. 1 and 2 in order to more fully describe the operation of the present embodiment. In step 402 of FIG. 4, the present embodiment determines whether a transcoding proxy server (e.g., 208) has received a web page request from a device (e.g., 202) having limited display capabilities. If a web page request has not been received by the transcoding proxy server from the device at step 402, the present embodiment proceeds to the beginning of step 402. However, if a web page request has been received by the transcoding proxy server from a device at step 402, the present embodiment proceeds to step 404. At step 404, the present embodiment causes the transcoding proxy server (e.g., 208) to transmit the received web page request to its corresponding web server (e.g., 214) via the Internet (e.g., 212).

In step 406, the present embodiment determines whether there is an extensible transcoder annotation (XTA) file (or database) stored with a memory device or devices of the transcoding proxy server (e g, 208). If there is an XTA file stored by the transcoding proxy server at step 406, the present embodiment proceeds to step 410. However, if there is not an XTA file stored by the transcoding proxy server at step 406, the present embodiment proceeds to step 408. At step 408, the present embodiment causes the transcoding proxy server (e.g., 208) to transmit and not transcode any web content it receives from the web server (e.g., 214) to the requesting device (e.g., 202) having limited display capabilities. In this manner, the transcoding proxy server (e.g., 208) is acting like an open pipe between the web server (e.g., 214) and the device e.g. 202) having limited display capabilities. After completing step 408, the present embodiment proceeds to the beginning of step 402.

At step 410 of FIG. 4, the present embodiment determines if there is a specific 5 XTA rule set (e.g., 322) within the XTA file that pertains to the requested web page. It is understood that step 410 of the present embodiment is well suited to be implemented in a wide variety of ways. For example, if the transcoding proxy server (e.g., 208) received a URL with the web page request, the present embodiment may use that URL to determine if there is a specific XTA rule set (e.g., 322) within the XTA file that pertains to that same URL. If there is not a specific XTA rule set (e.g., 322) that pertains to the requested web page at step 410, the present embodiment proceeds to step 414. However, if there is a specific XTA rule set (e.g., 322) that pertains to the requested web page at step 410, the present embodiment proceeds to step 412. In step 412, the present embodiment causes the transcoding proxy server (e.g., 208) to follow the instructions of the specific XTA rule set (e.g., 322) in order to transcode the requested web page content received from the web content server (e.g., 214) for the requesting device (e.g., 202) having limited display capabilities. Once step 412 is completed, the present embodiment proceeds to the beginning of step 402.

In step 414, the present embodiment determines if there is a layout XTA rule set (e.g., 302) within the XTA file that matches the layout properties of the requested web page. It is appreciated that step 4'14 of the present embodiment is well suited to be implemented in a wide variety of ways. For example, as the transcoding proxy server (e.g., 208) receives the requested web page from the web content server (e g., 214), the present embodiment may analyze the layout of the web content and determine if there is a layout XTA rule set (e.g., 302) within the XTA file that closely matches the same layout of the web content. If there is not a layout XTA rule set (e.g., 302) that closely matches the analyzed layout of the requested web page at step 414, the present embodiment proceeds to step 418. However, if there is a layout XTA rule set (e.g., 302) that closely matches the analyzed layout of the requested web page at step 414, the present embodiment proceeds to step 416.

At step 416 of FIG. 4, the present embodiment causes the transcoding proxy server (e.g., 208) to follow the instructions of the layout XTA rule set (e.g., 302) in order to transcode the requested web page content received from the web content server (e.g., 214) for the requesting device (e.g., 202) having limited display capabilities. Once step 416 is completed, the present embodiment proceeds to the beginning of step 402. In step 418, the present embodiment causes the transcoding proxy server (e.g., 208) to follow the instructions of the default XTA rule set (e.g., 340) in order to transcode the requested web page content received from the web content server (e.g., 214) for the requesting device (e.g., 202) having limited display capabilities. Once step 418 is completed, the present embodiment proceeds to the beginning of step 402.

Figure 5:
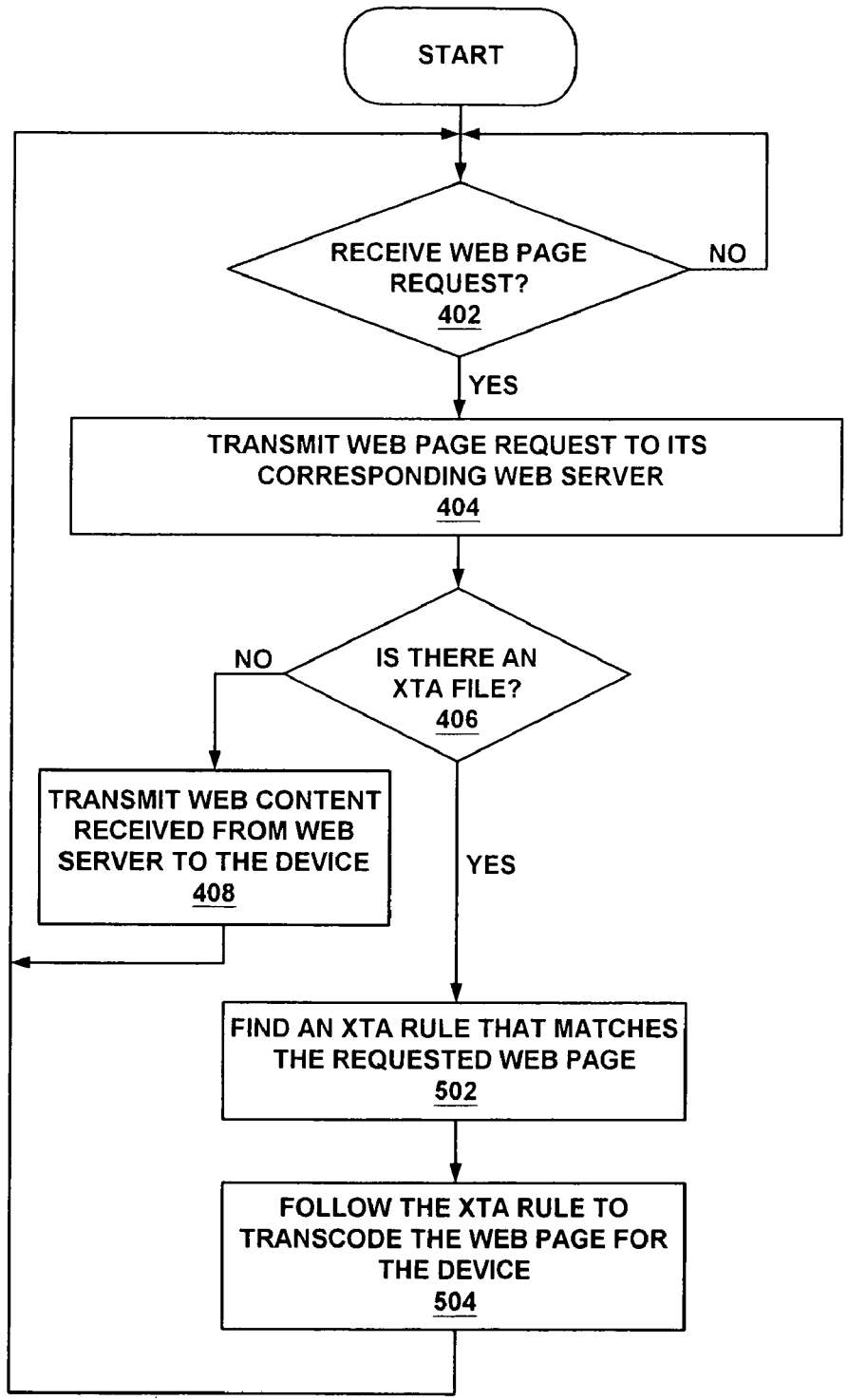
FIG. 5 is a flowchart of steps performed in accordance with another embodiment of the present invention for enabling a transcoding proxy server to utilize XTA to transcode web pages for a portable computing device having limited display capabilities.

FIG. 5 is a flowchart 500 of steps performed in accordance with one embodiment of the present invention for enabling a transcoding proxy server (e.g., 208) to utilize XTA to transcode web pages for a portable computing device (e.g., 202) having limited display capabilities. Flowchart 500 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 500, such steps are exemplary. That is, the present invention is well suited to performing various other steps or variations of the steps recited in FIG. 5. Within the present embodiment, it should be appreciated that the steps of flowchart 500 may be performed by software or hardware or any combination of software and hardware.

Within the present embodiment, the rules for transcoding web pages are abstracted from the transcoding functionality of a transcoding proxy server (e.g., 208). Specifically, within the transcoding proxy server (e.g., 208), the functions that perform the transcoding of web content for a device (e.g., 202) having limited display capabilities is completely separate and distinct from its transcoding rules software (e.g., XTA) that provides the order, manner, and/or what web page content should be transcoded for the requesting device. As such, when the transcoding proxy server (e.g., 208) receives a web page request from a device (e.g., 202) having limited display capabilities, the present embodiment determines whether an XTA file (or database) exists within a memory device or devices of the transcoding proxy server. If the XTA file exists, the present embodiment searches for an XTA rule set (e.g., 302, 322, and 340) that pertains to the requested web page. Upon finding a corresponding XTA rule set, the present embodiment causes the transcoding proxy server (e.g., 208) to follow the instructions of the XTA rule set in order to transcode the requested web page for the device (e.g., 202) having limited display capabilities.

It is appreciated that steps 402, 404, 406, and 408 of FIG. 5 are similar to steps 402, 404, 406, and 408 of FIG. 4 described above. However, at step 406 of FIG. 5, if the present embodiment determines that there is an XTA file stored by the transcoding proxy server (e.g., 208), the present embodiment proceeds to step 502. In step 502, the present embodiment locates an XTA rule set (e.g., 302, 322, or 340) within the XTA file that matches the web page requested by the device (e.g., 202) having limited capabilities. It is understood that step 502 of the present embodiment is well suited to be implemented in a wide variety of ways. For example, at step 502, the present embodiment may locate an XTA rule set within the XTA file that matches the requested web page by using a URL of the web page request or the analyzed layout of the requested web page received from the web content server (e.g., 214). At step 504, the present embodiment causes the transcoding proxy server (e.g., 208) to follow the instructions of the XTA rule set in order to transcode the requested web page content received from the web content server (e.g., 214) for the requesting device (e.g., 202) having limited display capabilities. Once step 504 is completed, the present embodiment proceeds to the beginning of step 402.

Figure 6:
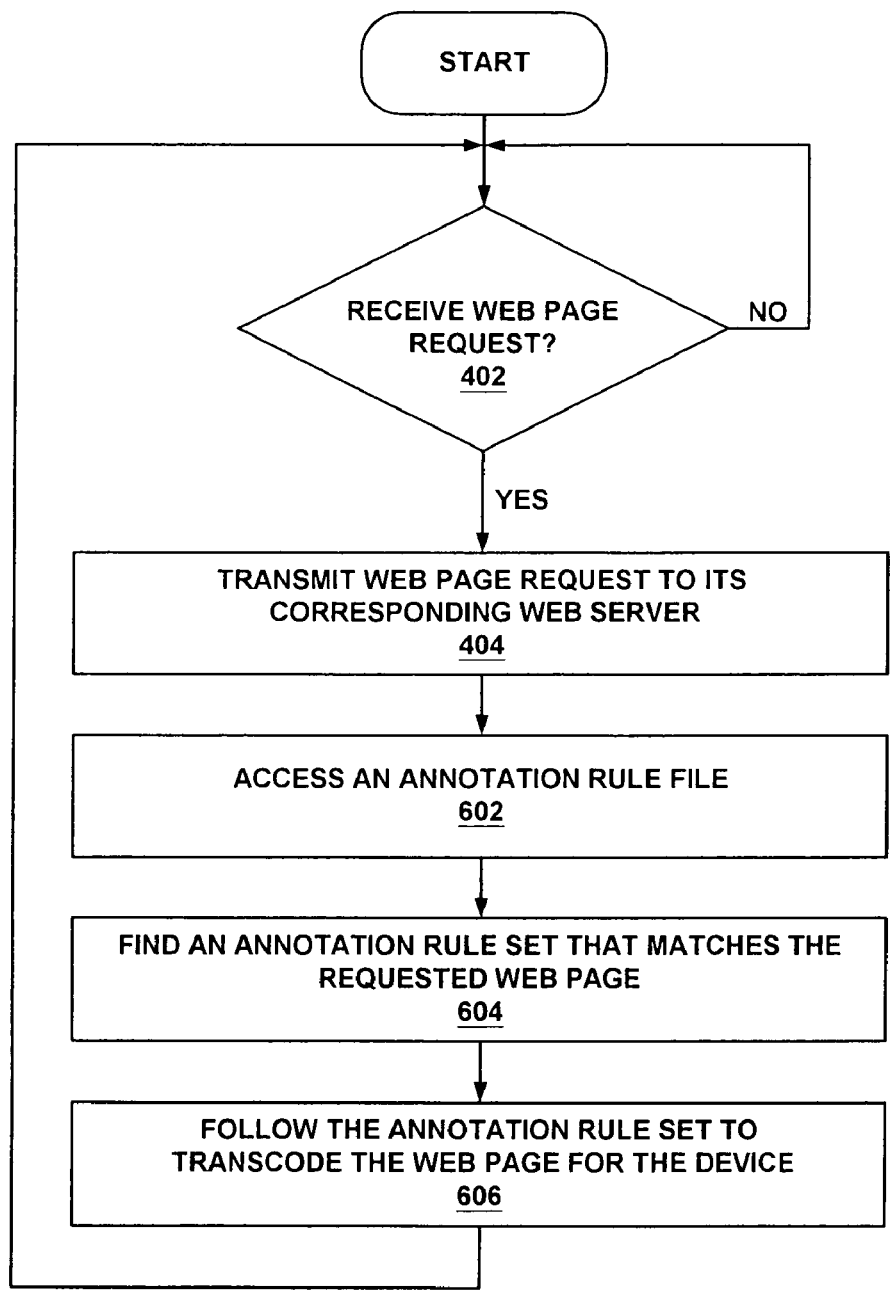
FIG. 6 is a flowchart of steps performed in accordance with one embodiment of the present invention for enabling a transcoding proxy server to utilize an annotation transcoding rule set to transcode web pages for a portable computing device having limited display capabilities.

FIG. 6 is a flowchart 600 of steps performed in accordance with one embodiment of the present invention for enabling a transcoding proxy server (e.g., 208) to utilize a transcoding annotation rule set to transcode web pages for a portable computing device (e.g., 202) having limited display capabilities. Flowchart 600 includes processes of the present invention which, in one embodiment, are carried out by processors and electrical components under the control of computer readable and computer executable instructions. The computer readable and computer executable instructions reside, for example, in data storage features such as computer usable volatile memory 104 and/or computer usable non-volatile memory 106 of FIG. 1. However, the computer readable and computer executable instructions may reside in any type of computer readable medium. Although specific steps are disclosed in flowchart 600, such steps are exemplary. That is, the present invention is well suited to performing various other steps or variations of the steps recited in FIG. 6. Within the present embodiment, it should be appreciated that the steps of flowchart 600 may be performed by software or hardware or any combination of software and hardware.

Within the present embodiment, the rules for transcoding web pages are abstracted from the transcoding functionality of a transcoding proxy server (e.g., 208). Specifically, within the transcoding proxy server (e.g., 208), the functions that perform the transcoding of web content for a device (e.g., 202) having limited display capabilities is completely separate and distinct from its transcoding rules software that provides the order, manner, and/or what web page content should be transcoded for the requesting device. As such, when the transcoding proxy server (e.g., 208) receives a web page request from a device (e.g., 202) having limited display capabilities, the present embodiment accesses an annotation rule file (or database) within a memory device or devices of the transcoding proxy server. The present embodiment searches within the annotation rule file for an annotation rule set that pertains to the requested web page. Upon finding a corresponding annotation rule set, the present embodiment causes the transcoding proxy server (e.g., 208) to follow the instructions of the annotation rule set in order to transcode the requested web page for the device (e.g., 202) having limited display capabilities.

It is appreciated that steps 402 and 404 of FIG. 6 are similar to steps 402 and 404 of FIG. 4 described above. However, once step 404 of FIG. 6 is completed, the present embodiment proceeds to step 602. At step 602, the present embodiment accesses an annotation rule file (or database) stored by a memory device or devices of the transcoding proxy server (e.g., 208). In step 604, the present embodiment locates an annotation rule set within the annotation rule file that matches the web page requested by the device (e.g., 202) having limited capabilities. It is appreciated that step 604 of the present embodiment is well suited to be implemented in a wide variety of ways. For example, at step 604, the present embodiment may locate an annotation rule set within the annotation rule file that matches the requested web page by using a URL of the web page request or the analyzed layout of the requested web page received from the web content server (e.g., 214). At step 606, the present embodiment causes the transcoding proxy server (e g", 208) to follow the instructions of the annotation rule set in order to transcode the requested web page content received from the web content server (e.g., 214) for the requesting device (e.g., 202) having limited display capabilities. Once step 606 is completed, the present embodiment proceeds to the beginning of step 402.

Accordingly, embodiments of the present invention provide a method and system for providing quality web page products from the Internet to portable computing devices having limited display capabilities. Furthermore, embodiments of the present invention provide a method and system which also enables portable computing devices having limited display capabilities to access any web page on the Internet. Additionally, embodiments of the present invention provide a method and system which is not cumbersome to users of portable computing devices having limited display capabilities.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method for enabling a transcoding proxy server to utilize an annotation rule set in order to transcode a web page for a portable computing device, said method comprising the steps of:

(a) a transcoding proxy server receiving a web page request from a portable computing device;

(b) said transcoding proxy server transmitting said web page request to a server computer coupled to said transcoding proxy server;

(c) said transcoding proxy server receiving from said server computer a web page element corresponding to said web page request;

(d) said transcoding proxy server locating, in a database coupled to said transcoding proxy server, a first annotation rule set that corresponds to said web page request by (i) checking for a specific rule set associated with the web page, and if the specific rule set exists then using the specific rule set as the first annotation rule set, and (ii) if the specific rule set does not exist, checking for a layout rule set pertaining to the web page, and if the layout rule set exists then using the layout rule set as the first annotation rule set, and (iii) if the specific rule set and the layout rule set do not exist, then using a default rule set associated with the portable computing device as the first annotation rule set, wherein said first annotation rule set is distinct from a transcoding functionality utilized by said transcoding proxy server; and (e) said transcoding proxy server transcoding said web page element for said portable computing device by following said first annotation rule set and utilizing said transcoding functionality.

2. The method as described in claim 1 further comprising the step of:

(f) said transcoding proxy server receiving and storing a second annotation rule set while said transcoding proxy server is operating.

3. The method as described in claim 1 further comprising the step of:

(f) editing said first annotation rule set while said transcoding proxy server is operating.

4. The method as described in claim 1, further comprising the step of:

(f) deleting a second annotation rule set stored by said transcoding proxy server while said transcoding proxy server is operating.

5. The method as described in claim 1 wherein said portable computing device comprises a personal digital assistant (PDA).

6. The method as described in claim 1 wherein said portable computing device comprises a mobile phone.

7. The method as described in claim 1 wherein said portable computing device comprises a pager.

8. The method as described in claim 1 wherein said first annotation rule set is extensible.

9. The method as described in claim 1 wherein said specific rule set comprises a Uniform Resource Locator (URL) that corresponds to said web page request.

10. The method as described in claim 1 wherein said layout rule set corresponds to a class of web pages that all share a common web page object.

11. The method as described in claim 1 wherein said layout rule set corresponds to a class of web pages that all share a common web page layout.

12. The method as described in claim 1 wherein said portable computing device has limited display capability.

13. A non-transitory computer readable medium having computer readable code embodied therein for causing a transcoding proxy computer to perform the steps of:

(a) receiving a web page request from a portable computing device;

(b) transmitting said web page request to a server computer coupled to said transcoding proxy computer;

(c) receiving from said server computer a web page element corresponding to said web page request;

(d) locating, in a database coupled to said transcoding proxy server, a first annotation rule set that corresponds to said web page request by (i) checking for a specific rule set associated with the web page, and if the specific rule set exists then using the specific rule set as the first annotation rule set, and (ii) if the specific rule set does not exist, checking for a layout rule set pertaining to the web page, and if the layout rule set exists then using the layout rule set as the first annotation rule set, and (iii) if the specific rule set and the layout rule set do not exist, then using a default rule set associated with the portable computing device as the first annotation rule set, wherein said first annotation rule set is distinct from transcoding functionality utilized by said transcoding proxy server; and (e) transcoding said web page element for said portable computing device by following said first annotation rule set and utilizing said transcoding functionality.

14. The non-transitory computer readable medium as described in claim 13 further comprising the step of:

(f) said transcoding proxy server receiving and storing a second annotation rule set while said transcoding proxy server is operating.

15. The non-transitory computer readable medium as described in claim 13 further comprising the step of:

(f) editing said first annotation rule set while said transcoding proxy server is operating.

16. The non-transitory computer readable medium as described in claim 13 further comprising the step of:

(f) deleting a second annotation rule set stored by said transcoding proxy server while said transcoding proxy server is operating.

17. The non-transitory computer readable medium as described in claim 13 wherein said portable computing device comprises a personal digital assistant (PDA).

18. The non-transitory computer readable medium as described in claim 13 wherein said portable computing device comprises a mobile phone.

19. The non-transitory computer readable medium as described in claim 13 wherein said portable computing device comprises a pager.

20. The non-transitory computer readable medium as described in claim 13 wherein said first annotation rule set is extensible.

21. The non-transitory computer readable medium as described in claim 13 wherein said specific rule set comprises a Uniform Resource Locator (URL) that corresponds to said web page request.

22. The non-transitory computer readable medium as described in claim 13 wherein said layout rule set corresponds to a class of web pages that all share a common web page object.

23. The non-transitory computer readable medium as described in claim 13 wherein said layout rule set corresponds to a class of web pages that all share a common web page layout.

24. The non-transitory computer readable medium as described in claim 13 wherein said portable computing device has limited display capability.

25. A method for enabling a transcoding proxy server to utilize an annotation rule set in order to transcode a web page for a personal digital assistant, said method comprising the steps of:
(a) a transcoding proxy server receiving a web page request from a personal digital assistant;
(b) said transcoding proxy server transmitting said web page request to a server computer coupled to said transcoding proxy server;
(c) said transcoding proxy server receiving from said server computer a web page element corresponding to said web page request;
(d) said transcoding proxy server locating, in a database coupled to said transcoding proxy server, a first extensible annotation rule set that corresponds to said web page request by
  (i) checking for a specific rule set associated with the web page, and if the specific rule set exists then using the specific rule set as the first extensible annotation rule set, and
  (ii) if the specific rule set does not exist, checking for a layout rule set pertaining to the web page, and if the layout rule set exists then using the layout rule set as the first extensible annotation rule set, and
  (iii) if the specific rule set and the layout rule set do not exist, then using a default rule set associated with the personal digital assistant as the first extensible annotation rule set,
wherein said first extensible annotation rule set is distinct from a transcoding functionality utilized by said transcoding proxy server; and
(e) said transcoding proxy server transcoding said web page element for said personal digital assistant by following said first extensible annotation rule set and utilizing said transcoding functionality.

26. The method as described in claim 25 further comprising the step of:
(f) said transcoding proxy server receiving and storing a second extensible annotation rule set while said transcoding proxy server is operating.

27. The method as described in claim 25 further comprising the step of:
(f) editing said first extensible annotation rule set while said transcoding proxy server is operating.

28. The method as described in claim 25 further comprising the step of:
(f) deleting a second extensible annotation rule set stored by said transcoding proxy server while said transcoding proxy server is operating.

29. The method as described in claim 25 wherein said specific rule set comprises a Uniform Resource Locator (URL) that corresponds to said web page request.

30. The method as described in claim 25 wherein said layout rule set corresponds to a class of web pages that all share a common web page object.

31. The method as described in claim 25 wherein said layout rule set corresponds to a class of web pages that all share a common web page layout.

* * * * *